United States Patent
Kim et al.

(10) Patent No.: US 11,157,357 B2
(45) Date of Patent: Oct. 26, 2021

(54) OPERATION METHODS OF MEMORY SYSTEM AND HOST, AND COMPUTING SYSTEM

(71) Applicant: SAMSUNG ELECTRONICS CO., LTD., Suwon-si (KR)

(72) Inventors: Chansol Kim, Hwaseong-si (KR); Suman Prakash Balakrishnan, Bangalore (IN); Seokhwan Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/855,000

(22) Filed: Apr. 22, 2020

(65) Prior Publication Data

US 2021/0103495 A1 Apr. 8, 2021

(30) Foreign Application Priority Data

Oct. 4, 2019 (KR) .......................... 10-2019-0123348

(51) Int. Cl.
*G11C 29/00* (2006.01)
*G06F 11/10* (2006.01)
*G06F 11/14* (2006.01)
*G06F 12/10* (2016.01)
*G06F 11/30* (2006.01)
*G06F 12/02* (2006.01)
*G06F 11/07* (2006.01)

(52) U.S. Cl.
CPC ...... *G06F 11/1068* (2013.01); *G06F 11/0772* (2013.01); *G06F 11/1489* (2013.01); *G06F 11/3037* (2013.01); *G06F 12/0253* (2013.01); *G06F 12/10* (2013.01)

(58) Field of Classification Search
CPC ............ G06F 11/1068; G06F 11/1489; G06F 11/3037; G06F 11/0772; G06F 12/10; G06F 12/0253
See application file for complete search history.

(56) References Cited

U.S. PATENT DOCUMENTS

| | | |
|---|---|---|
| 8,195,878 B2 | 6/2012 | Mittendorff et al. |
| 8,341,332 B2 | 12/2012 | Ma et al. |
| 9,304,946 B2 | 4/2016 | Solihin |
| 9,727,454 B2 | 8/2017 | Kuzmin et al. |
| 9,760,502 B2 | 9/2017 | Raam |
| 9,886,383 B2 | 2/2018 | Cohen et al. |

(Continued)

FOREIGN PATENT DOCUMENTS

KR 10-2018-0035271 A 4/2018

*Primary Examiner* — Samir W Rizk
(74) *Attorney, Agent, or Firm* — Sughrue Mion, PLLC

(57) ABSTRACT

A method of operating a memory system including a memory device, including reading data from the memory device based on a first physical address received from a host according to a read request received from the host; detecting a read error of the read data; correcting the read data based on the detecting; transmitting the corrected data to the host; asynchronously transmitting to the host an error occurrence signal for the read error; generating information about the read error; transmitting the information about the read error to the host; and rewriting the corrected data based on a second physical address received from the host according to a write request of the host.

18 Claims, 13 Drawing Sheets

(56) References Cited

U.S. PATENT DOCUMENTS

| | | | |
|---|---|---|---|
| 10,474,527 B1* | 11/2019 | Sun | G06F 11/1068 |
| 2018/0088841 A1 | 3/2018 | Ma et al. | |
| 2019/0095274 A1 | 3/2019 | Lin | |
| 2021/0090684 A1* | 3/2021 | Kim | G11C 29/88 |

* cited by examiner

OPERATION METHODS OF MEMORY SYSTEM AND HOST, AND COMPUTING SYSTEM

CROSS-REFERENCE TO THE RELATED APPLICATION

This application is based on and claims priority under 35 U.S.C. § 119 to Korean Patent Application No. 10-2019-0123348, filed on Oct. 4, 2019, in the Korean Intellectual Property Office, the disclosure of which is incorporated by reference herein in its entirety.

BACKGROUND

1. Field

The present disclosure relates to a memory system, a host, and a computing system, and more particularly, to a memory system, a host, and a computing system which recover data having a read error, and operation methods of the memory system, the host, and the computing system.

2. Description of Related Art

A memory system may include a general solid state drive (SSD) having a flash translation layer or an open channel SSD (SDD) having no flash translation layer. Because the open channel SSD may not support an address mapping function of mapping a logical address and a physical address of a storage device, a host may process a read error occurring therein.

SUMMARY

Provided are operation methods of a memory system and a host, and a computing system which improve reliability and efficiency as the memory system generates information on a read error and the host performs recovery based on the information generated by the memory system.

According to an embodiment, a method of operating a memory system includes reading data from the memory device based on a first physical address received from a host according to a read request received from the host; detecting a read error of the read data; correcting the read data based on the detecting; transmitting the corrected data to the host; asynchronously transmitting to the host an error occurrence signal for the read error; generating information about the read error; transmitting the information about the read error to the host; and rewriting the corrected data based on a second physical address received from the host according to a write request of the host.

According to an embodiment, a method of operating a host configured to control a memory system includes transmitting a read request from the host to the memory system based on a first physical address; receiving read data corresponding to the read request from the memory system; asynchronously receiving an error occurrence signal for a read error corresponding to the read data from the memory system; receiving information about the read error from the memory system; and transmitting a recovery command for recovering the read error to the memory system based on the read data and the information about the read error.

According to an embodiment, a computing system includes a memory system including a memory device; and a host configured to transmit a read request to the memory system based on a first physical address, wherein the memory system, in response to the read request of the host, is configured to read data from the memory device based on the first physical address received from the host, detect a read error of the read data, correct the read data based on the detecting, transmit the corrected data to the host, wherein the memory system is further configured to asynchronously transmit an error occurrence signal for the read error to the host, generate information about the read error, and transmit the information about the read error to the host, and wherein, based receiving on the error occurrence signal, the host is configured to transmit a recovery command for recovering the read error to the memory system based on the corrected data and the information about the read error.

BRIEF DESCRIPTION OF THE DRAWINGS

Embodiments of the disclosure will be more clearly understood from the following detailed description taken in conjunction with the accompanying drawings in which.

DETAILED DESCRIPTION

Figure 1:
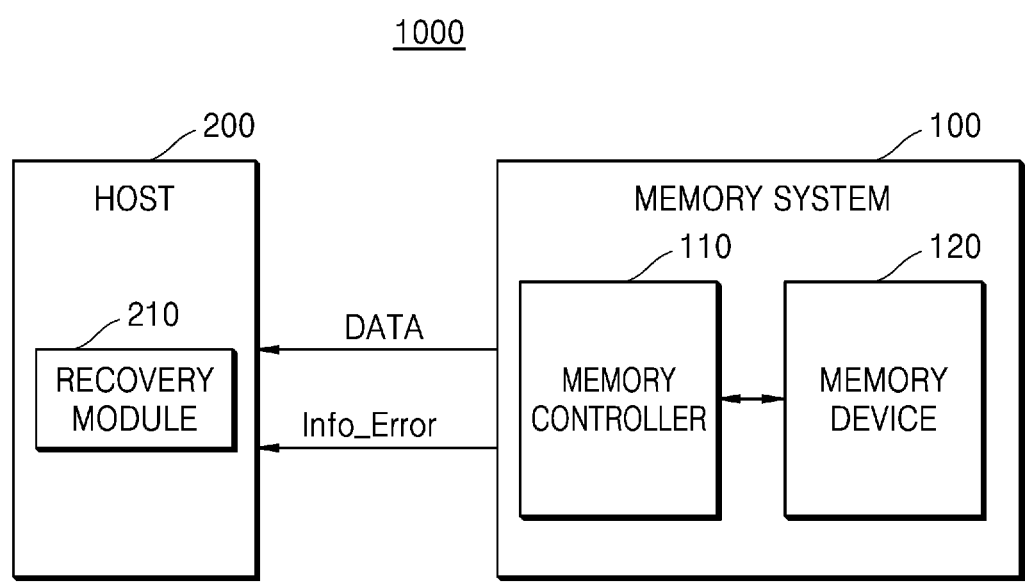
FIG. 1 is a block diagram illustrating a computing system according to an embodiment.

FIG. 1 is a block diagram illustrating an example of a computing system according to an embodiment.

Referring to FIG. 1, the computing system 1000 may include a memory system 100 and a host 200. The computing system 1000 may be configured as one of various types of systems including the memory system 100 that stores data. For example, the computing system 1000 may be one of various types of systems such as, a computer, a net-book, a web tablet, a wireless phone, a mobile phone, a smartphone, an e-book, a navigation device, a digital camera, a wearable device, an internet of things (IoT) device, an internet of everything (IoE) device, a virtual reality (VR) device, and an augmented reality (AR) device.

The memory system 100 may include a memory controller 110 and a memory device 120. The memory system 100 may include one or more storage media. For example, the memory system 100 may include one or more solid state drives (SSDs). In addition, the memory system 100 may include one or more open channel SSDs. The open channel SSD may refer to an SSD that does not include a flash translation layer (FTL). Because the open channel SSD does not have a flash translation layer (FTL) for mapping a logical address provided from the host and a physical address of a storage device, the open channel SSD may not directly manage addresses. Accordingly, the open channel SSD may receive the physical address from the host 200 instead of the logical address to perform a write operation, a read operation, and an erasure operation. In addition, even when an error occurs in a storage device, the open channel SSD may perform a recovery operation through the host 200 without directly performing recovery such as storing recovered data in another address randomly. In addition, according to an embodiment, the open channel SSD may include mapping information for defining a relationship between the logical address provided from the host 200 and the physical address of the storage device, but the open channel SSD may not directly manage the addresses by using the mapping information.

The host 200 may provide an access request for data to the memory system 100. For example, the host 200 may provide write request or read request for data to the memory system 100, and the memory system 100 may write data to the memory device 120 or read the data from the memory device 120 according to an access request from the host 200 to provide the data to the host 200. In addition, the memory system 100 may perform an erase operation for data in a region indicated by the host 200 according to a data erase request from the host 200.

In general, when the memory system 100 is not the open channel SSD, the host 200 may provide an access request to the memory system 100 based on a logical address. However, when the memory system 100 is the open channel SSD or when the host 200 has mapping information for defining a relationship between the logical address and the physical address of the memory device 120, the host 200 may provide the access request to the memory system 100 based on the physical address of the memory system 100. For example, the host 200 may determine the physical address by using the mapping information included in the host 200 and provide the access request to the memory system 100 based on the determined physical address. The memory system 100 may perform a write operation, a read operation, or an erase operation based on the physical address received from the host 200.

The host 200 may include a recovery module 210. The recovery module 210 may be implemented in various forms and included in the host 200. For example, in embodiments, the recovery module 210 may be implemented by hardware (HW) such as a circuit for performing various types of processing for recovery of data having an error. In embodiments, the recovery module 210 may be implemented by software (SW) including a program and perform various types of processing for the recovery of the data having an error when a processing unit included in the host 200 operates the recovery module 210 loaded in an operation memory. In embodiments, the recovery module 210 may be implemented by a combination of hardware and software.

The recovery module 210 may support a function of recovering the data having an error. For example, the memory system 100 may detect a correctable read error in a process of reading data according to an access request of the host 200, and when the memory system 100 transmits information on the read error Info_Error to the host 200, the recovery module 210 may perform recovery of the corresponding error based on the information Info_Error on the read error.

For example, the host 200 may provide a read request based on the physical address determined by using mapping information on the memory system 100. The memory system 100 may perform a read operation for the memory device 120 based on the physical address received from the host 200 in response to the read request. The memory system 100 may detect a read error of the read data and correct the read data when a read error is detected. The memory system 100 may transmit corrected read data DATA to the host 200.

In addition, the memory system 100 may notify that a correctable read error has occurred by providing an error generation signal for the read error to the host 200 in an asynchronous manner. Here, the asynchronous manner may refer to a method by which the memory system 100 performs a detailed operation when a predetermined event is detected without a request of the host 200. The memory system 100 may provide the information on the read error Info_Error to the host 200.

The recovery module 210 may generate a recovery command for recovering the read error by using the read data DATA obtained from the memory system 100 and the information on the read error Info_Error. The host 200 may provide the recovery command to the memory system 100. For example, the host 200 may determine a new physical address based on the mapping information of the memory system 100 and the information on the read error Info_Error, generate a write request for rewriting the read data DATA based on the obtained read data DATA and the new physical address, and provide the write request to the memory system 100 as the recovery command. The memory system 100 may recover the read data DATA according to the recovery command received from the host 200. For example, the memory system 100 may perform a rewrite operation based on the new physical address and the read data DATA received from the host 200. At this time, the read data DATA may correspond to data read from the memory device 120 and corrected.

The computing system 1000 according to the embodiment described above may perform a recovery operation based on a recovery command received from the recovery module 210 of the host 200 even when the memory system 100 may not recover the read error by itself by including the open channel SSD. In addition, because the memory system 100 instead of the host 200 may generate information used for recovering the read error, resource utilization of the host 200 may increase.

In addition, even when the read error of the memory system 100 is a correctable read error, when data having the corresponding error is repeatedly read, the read error may change into an uncorrectable read error. The computing system 1000 according to the embodiment may prevent an uncorrectable read error that may occur later by recovering data having a corresponding error before a correctable error is changed into the uncorrectable read error.

In addition, the computing system 1000 according to the embodiment may recover data by using a method of writing read data received from the memory system 100 to a new region without using a method of reading data of a region where the read error occurs, storing the read data in a temporary region, erasing data of the region where the read error occurs, and writing data in the region again as in the recovery method of related art, and thus, reliability may be prevented from decreasing due to a change of some data while performing the processes described above. Hereinafter, more detailed operations will be described with respect to the computing system 1000.

Figure 2:
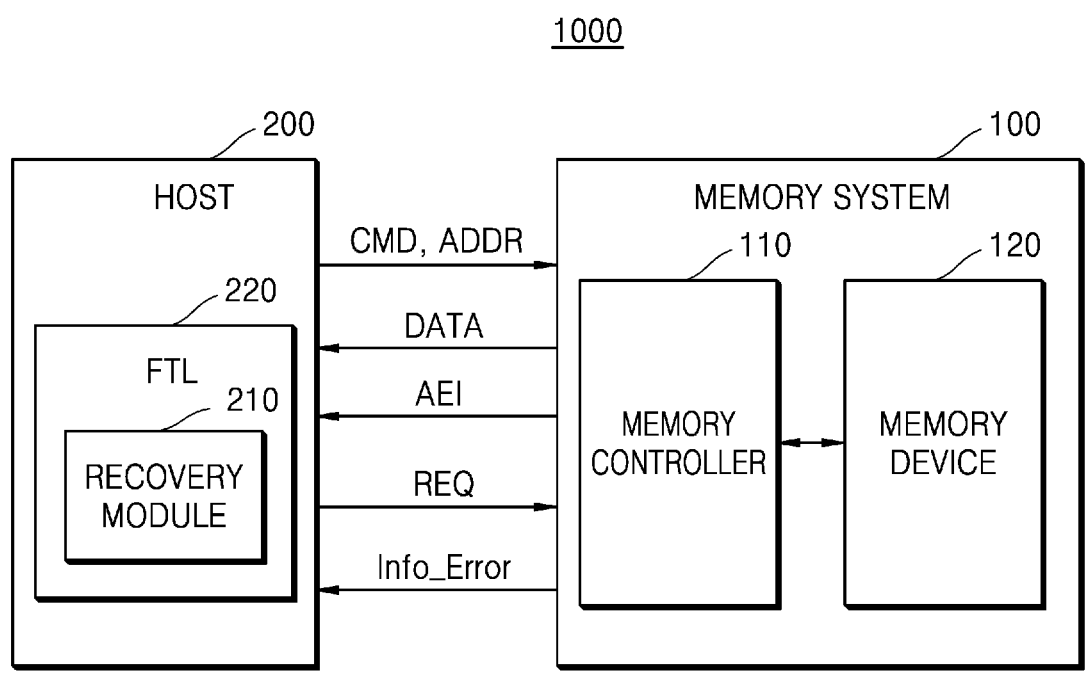
FIG. 2 is a block diagram illustrating a detailed implementation example of the computing system of FIG. 1, according to an embodiment.

FIG. 2 is a block diagram illustrating an example of a detailed implementation example of the computing system of FIG. 1.

Referring to FIGS. 1 and 2, the memory system 100 may be the open channel SSD, and the host 200 may include a flash translation layer 220.

The flash translation layer 220 of the host 200 may manage operations such as a write operation, a read operation, and an erase operation of the memory system 100 by using the mapping information of the memory system 100. In addition, the flash translation layer 220 may perform an address mapping function of mapping a logical address used in the host 200 and a physical address of the memory device 120 to each other and a garbage collection function.

According to the embodiment, the recovery module 210 may be included in the flash translation layer 220. The flash translation layer 220 may recover an error occurring in the memory system 100 by using the recovery module 210 while managing the operations such as the write operation, the read operation, and the erase operation of the memory system 100.

The flash translation layer 220 may be implemented in the form of software such as firmware, an operating system, or an application driven by the processing unit. In embodiments, the flash translation layer 220 may be implemented by hardware such as a circuit for performing various types of processing for management of the memory system 100. In embodiments, the flash translation layer 220 may be implemented by a combination of hardware and software.

The host 200 may convert a logical address into a physical address of the memory device 120 through the flash translation layer 220 and transmit a read command CMD and the physical address ADDR to the memory system 100.

The memory controller 110 may perform a read operation for the memory device 120 based on the physical address ADDR. The memory controller 110 may detect a read error. For example, the memory controller 110 may detect a read error by checking whether an error bit occurs in the data read from the memory device 120. When the read error is detected, the memory controller 110 may correct an error bit of the read data. The memory controller 110 may transmit the corrected read data DATA to the host 200. A series of operations of the memory controller 110 described above which reads data, detects a read error, corrects the data, and transmits the corrected data may be performed synchronously in response to a read request received from the host 200.

The memory controller 110 may transmit asynchronous event information AEI to the host 200 as an error occurrence signal. The asynchronous event information may refer to information indicating that an error occurs in the memory system 100 in an asynchronous manner. For example, the asynchronous event information AEI may include information indicating that a correctable read error occurs.

The memory controller 110 may generate the information on the read error Info_Error. The information on the read error Info_Error may include a physical address of read data in which the read error occurs, an error type indicating that the occurred error corresponds to the read error, and the number of error bits of the read data. In addition, according to the embodiment, the information on the read error Info_Error may include the corrected read data DATA. In addition, the information on the read error Info_Error is not limited to the examples described above and may further include various types of information. The memory controller 110 may store the generated information on the read error Info_Error in the memory device 120 or a buffer of the memory controller 110.

The host 200 may transmit a request signal REQ for requesting information on an error to the memory controller 110. As one example, when obtaining the asynchronous event information AEI from the memory controller 110, the host 200 may transmit the request signal REQ for requesting the information on the error to the memory controller 110. The memory controller 110 may provide the host 200 with the previously generated information on the read error Info_Error.

In addition, as another example, the memory controller 110 may generate the information on the read error Info_Error and directly provide the host 200 with the generated information. In this case, the memory controller 110 may not store the information on the read error Info_Error, and instead, the host 200 may receive the information on the read error Info_Error to store in a memory of the host 200.

The host 200 may recover a correctable read error through the flash translation layer 220 and the recovery module 210. For example, the host 200 may determine a new physical address for storing read data having the read error based on mapping information of the memory system 100 and information on the read error Info_Error and may generate a write request based on the new physical address and the corrected read data DATA to provide to the memory system 100.

In addition, when the host 200 provides the write request, the corrected read data DATA may be obtained in various manners. As one example, the host 200 may first provide the memory system 100 with the read request again based on the physical address of read data having the read error included in the information on the read error Info_Error. The memory system 100 may read data again based on a read request, correct the read data, and provide the host 200 with the corrected data. The host 200 may provide the memory system 100 with the write request for recovering the read error based on the corrected read data DATA received from the memory system 100 and the new physical address.

As another example, when the memory system 100 generates the information on the read error Info_Error including the corrected read data DATA, the host 200 may check the corrected read data DATA included in the information on the read error Info_Error and provide the memory system 100 with the write request for recovering the read error based on the checked read data DATA and the new physical address. In this case, an operation the host 200 that retransmits the read request to the memory system 100 to obtain the read data DATA may be omitted.

Figure 3:
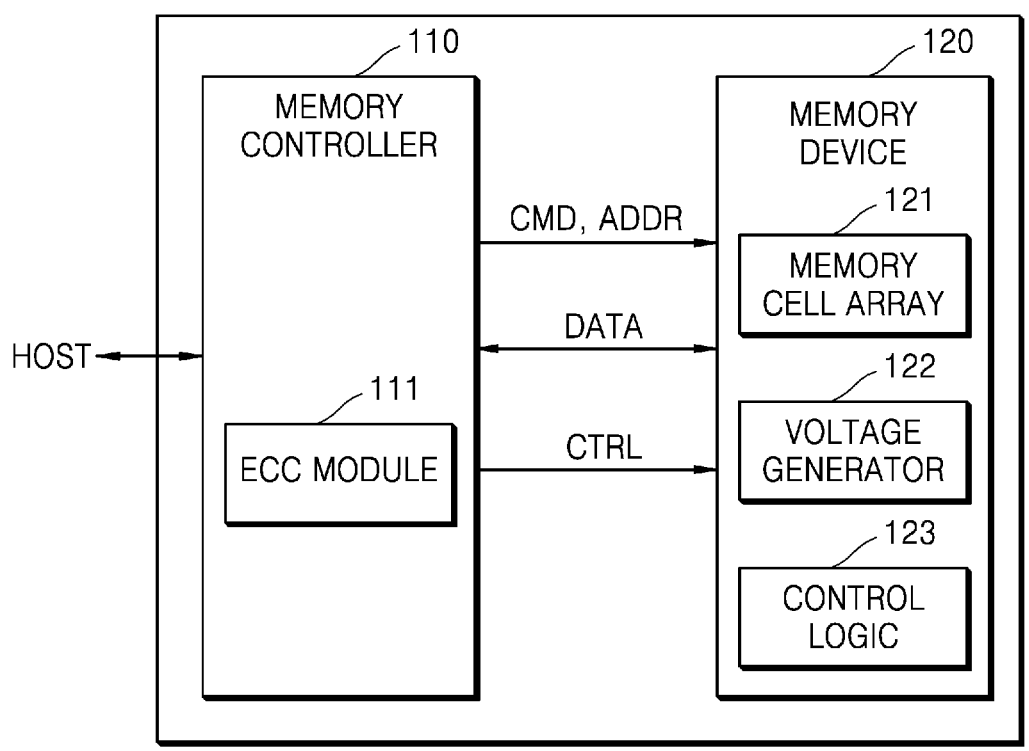
FIG. 3 is a block diagram illustrating a memory system according to an embodiment.

FIG. 3 is a block diagram illustrating an example of a memory system according to the embodiment.

Referring to FIG. 3, the memory system 100 may include the memory controller 110 and the memory device 120, and the memory controller 110 may include an error correcting code (ECC) module 111, and the memory device 120 may include a memory cell array 121, a voltage generator 122, and a control logic 123.

The memory controller 110 may control the memory device 120 to write data to the memory device 120 or to read or erase data stored in the memory device 120 in response to a write request or a read request from the host HOST. Specifically, the memory controller 110 may control a write operation, a read operation, or an erase operation of the memory device 120 by providing the memory device 120 with the address ADDR, the command CMD, or a control signal CTRL In addition, the data DATA to be written to the memory device 120 and the data DATA read from the memory device 120 may be transmitted and received between the memory controller 110 and the memory device 120.

The ECC module 111 may detect an error bit from the read data DATA received from the memory device 120. The ECC module 111 may determine whether the read data DATA has a correctable read error or an uncorrectable read error. For example, the ECC module 111 may determine whether correction is possible based on the number of error bits detected from the read data DATA. For example, the ECC module 111 may determine whether the number of error bits detected from the received data exceeds error correction capability of the ECC module 111, determine that the corresponding read error is correctable when the number of error bits does not exceed the error correction capability, and determine that the corresponding read error is uncorrectable when the number of error bits exceeds the error correction capability. When determining that the read error is correctable, the ECC module 111 may correct the read data DATA. The memory controller 110 may transmit the corrected read data to the host HOST through the ECC module 111.

The memory device 120 may be a nonvolatile memory device. The memory cell array 121 may include a plurality of memory cells, and for example, the plurality of memory cells may be flash memory cells. However, the disclosure is not limited thereto, and the plurality of memory cells included in the memory cell array 121 may be resistive memory cells of a RAM such as a resistive RAM (ReRAM), a phase change RAM (PRAM), or a magnetic RAM (MRAM).

The memory cell array 121 may include a plurality of blocks. In addition, each of the plurality of blocks may include a plurality of pages, and each page may include a plurality of memory cells. In the memory cell array 121, a data erase operation may be performed block by block, and a write operation and a read operation for data may be performed page by page. For example, the memory device 120 may perform the erase operation block by block with reference to the address ADDR from the memory controller 110 and perform the write operation and the read operation page by page.

The voltage generator 122 may generate various voltages for performing the write operation, the read operation, and the erase operation described above. In addition, the voltage generator 122 may generate a read voltage used for the data read operation and provide the memory cell array 121 with the read voltage. In addition, the voltage generator 122 may generate an erasure voltage having a high voltage level used for the erase operation and provide the memory cell array 121 with the erasure voltage.

The control logic 123 may control the overall operation of the memory device 120 in relation to a memory operation. For example, the control logic 123 may control the voltage generator 122, and the voltage generator 122 may change levels of various voltages generated under the control of the control logic 123. In addition, a threshold voltage distribution of the memory cells of the memory cell array 121 may be adjusted according to the voltages generated by the voltage generator 122.

Figure 4:
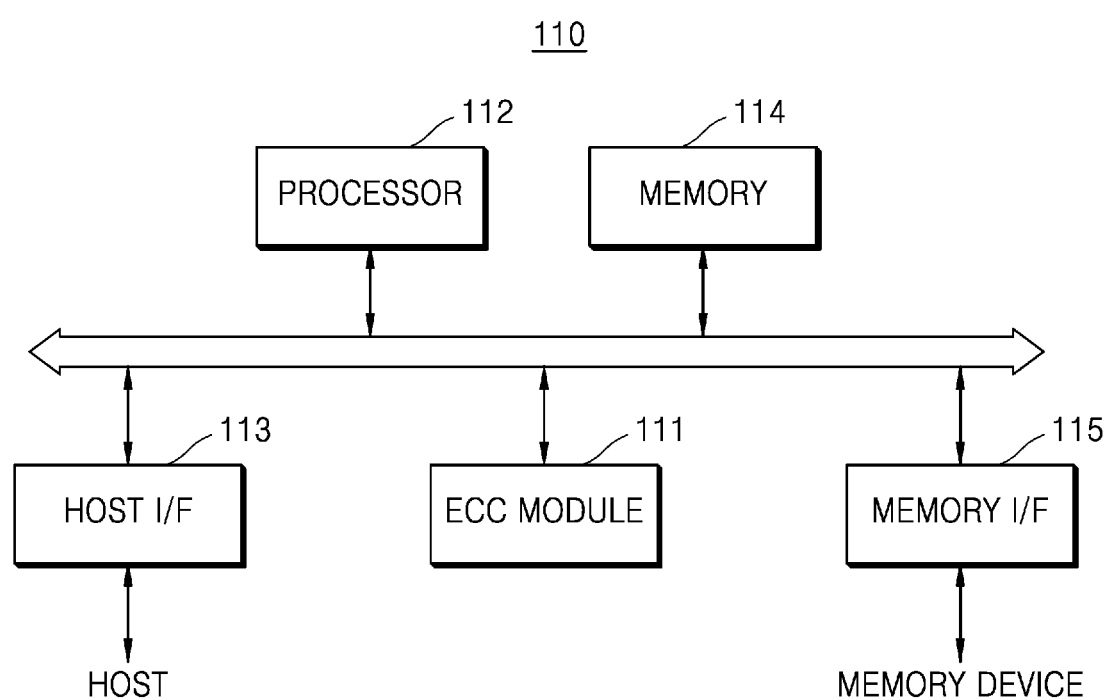
FIG. 4 is a diagram illustrating a memory controller according to the embodiment.

FIG. 4 is a diagram illustrating an example of the memory controller according to the embodiment.

Referring to FIGS. 3 and 4, the memory controller 110 may include the ECC module 111, a processor 112, a host interface 113, a memory 114, and a memory interface 115, which communicate with each other through a bus. The ECC module 111 may be substantially the same as described above with reference to FIG. 3, and thus, redundant descriptions thereof will be omitted.

The ECC module 111 may be implemented by hardware. However, the disclosure is not limited thereto, and the ECC module 111 may be implemented by firmware or software and may be loaded into the memory 114.

The processor 112 may include a central processing unit, a microprocessor, or the like and control the overall operation of the memory controller 110 by performing instructions stored in the memory 114.

The host interface 113 may provide a physical connection between the host HOST and the memory system 100. For example, the host interface 113 may include various interfaces such as, an advanced technology attachment (ATA), a serial ATA (SATA), an external SATA (e-SATA), a small computer small interface (SCSI), a serial attached SCSI (SAS), a peripheral component interconnection (PCI), PCI express (PCI-E), IEEE 1394, Universal Serial Bus (USB), secure digital (SD), a card, a multi-media card (MMC), an embedded multi-media card (eMMC), a compact flash (CF) card, an interface, non-volatile memory express (NVMe), and so on.

The host interface 113 may transmit various types of information to the host 200 in an asynchronous manner under the control of the processor 112. For example, the host interface 113 may generate an interrupt in a predetermined region of the host 200 to transmit various types of information to the host 200, which may be implemented in various manners such as MSI, MSI-X, pin based, and advanced error reporting (AER).

According to the embodiment, the host interface 113 may receive a read request from the host 200 and transmit data read from the memory device 120 or corrected data to the host 200. The host interface 113 may transmit error occurrence information to the host 200 in an asynchronous manner. For example, the host interface 113 may transmit the asynchronous event information AEI indicating that the read error occurs to the host 200. The host interface 113 may receive a request signal for requesting information on an error from the host 200 and transmit the information on the read error generated by the memory controller 110 to the host 200. The host interface 113 may receive the recovery command for recovering the read error from the host 200.

The memory 114 may operate under the control of the processor 112, may be used as an operation memory, a buffer memory, a cache memory, or the like, and may be plural. The memory 114 may be implemented by a volatile memory such as a DRAM or an SRAM, or by a nonvolatile memory such as a PRAM or a flash memory. In addition, in FIG. 4, the memory 114 is illustrated and described as being included in the memory controller 110, but the memory 114 may be implemented separately from the memory controller 110.

The memory interface 115 may provide a channel between the memory controller 110 and the memory device 120. For example, the command CMD, the address ADDR, the data DATA, and the like may be transmitted and received between the memory controller 110 and the memory device 120 through the memory interface 115.

Figure 5:
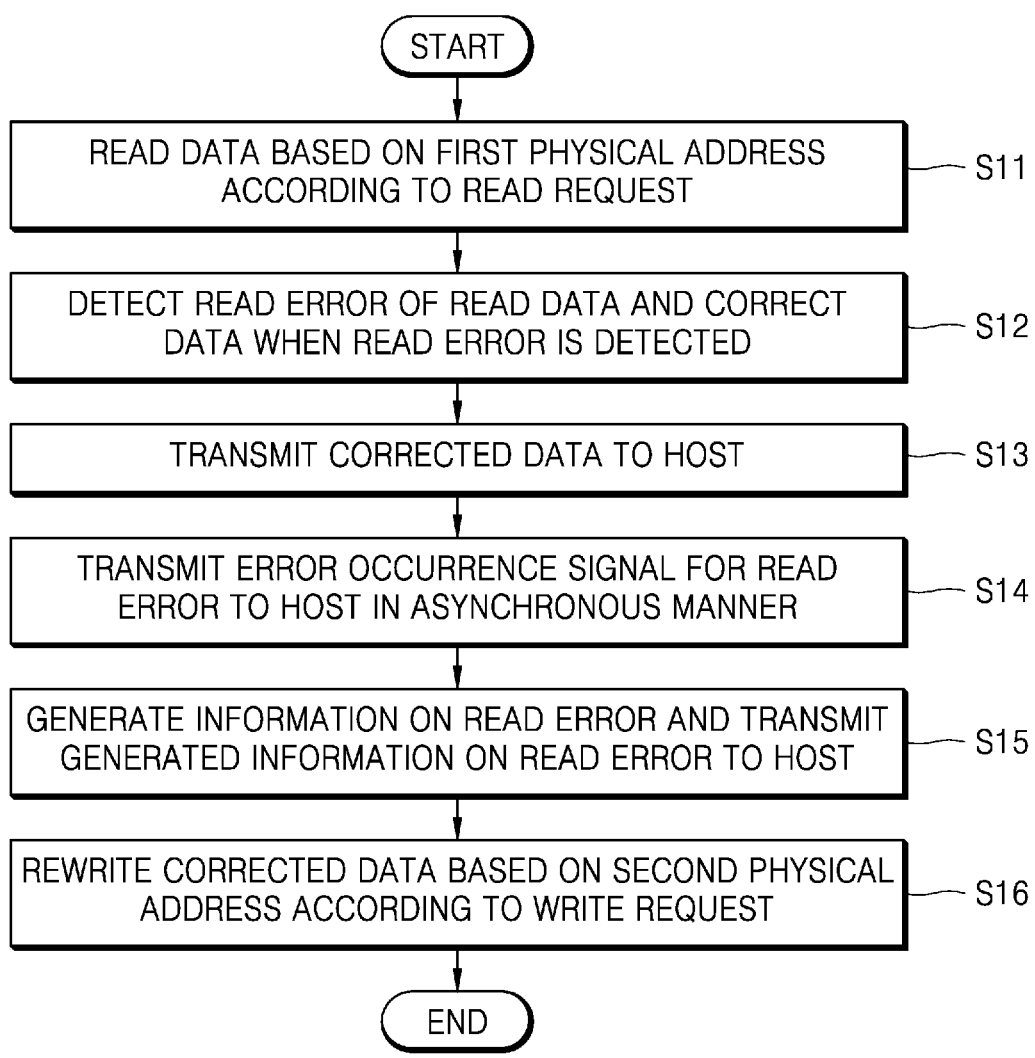
FIG. 5 is a flowchart illustrating an operation method of the memory system according to an embodiment.

FIG. 5 is a flowchart illustrating an example of an operation method of the memory system according to the embodiment.

The operation method according to the present embodiment may be performed by the memory system 100 of FIG. 1 or 2. Description made with reference to FIGS. 1 to 4 may be applied to the present embodiment.

First, the memory system may perform a read operation based on a physical address received from the host in response to a read request from the host at operation S11. For example, the memory system may read data from a region of the memory device corresponding to a first physical address received from the host.

The memory system may detect a read error of the read data and correct the read data when the read error is detected at operation S12. For example, the memory system may detect an error bit existing in the read data and correct the corresponding data when the number of detected error bits does not exceed error correction capability. The memory system may transmit the corrected read data to the host at operation S13.

The memory system may transmit an error occurrence signal for the read error to the host in an asynchronous manner at operation S14. For example, when the number of error bits detected in the read data does not exceed the error correction capability, the memory system may determine that a correctable read error occurs and transmit the asynchronous event information AEI indicating that the correctable read error occurs to the host.

The memory system may generate information on the read error and transmit the generated information on the read error to the host at operation S15. The information on the read error may include a physical address of the read data having the read error, an error type indicating that the occurred error corresponds to the read error, the number of error bits of the read data, and so on. In addition, according to the embodiment, the information on the read error may include corrected read data. In addition, the information on the read error is not limited to the example described above and may further include various types of information.

In addition, the operation of transmitting the information on the read error of the memory system may be performed when a signal for requesting the corresponding information is received from the host. In this case, the memory system may store the generated information on the read error in the memory device or store the generated information in a buffer of the memory controller and transmit the stored data to the host when the request signal is received from the host.

In embodiments, the operation of transmitting the information on the read error of the memory system may be performed after the operation of generating the information on the read error of the memory system regardless of whether the request signal from the host is received. In this case, the memory system may not store the generated information on the read error.

In response to the write request from the host, the memory system may perform a write operation based on the new physical address received from the host and the corrected read data at operation S16. The new physical address may be a physical address that the host determines based on mapping information of the memory system, and the information on the read error and may be a second physical address different from the first physical address. In addition, the corrected read data may be obtained from the information on the read error received by the host from the memory system or may be obtained from the memory system by transmitting the read request again to the memory system from the host based on the first physical address.

Figure 6:
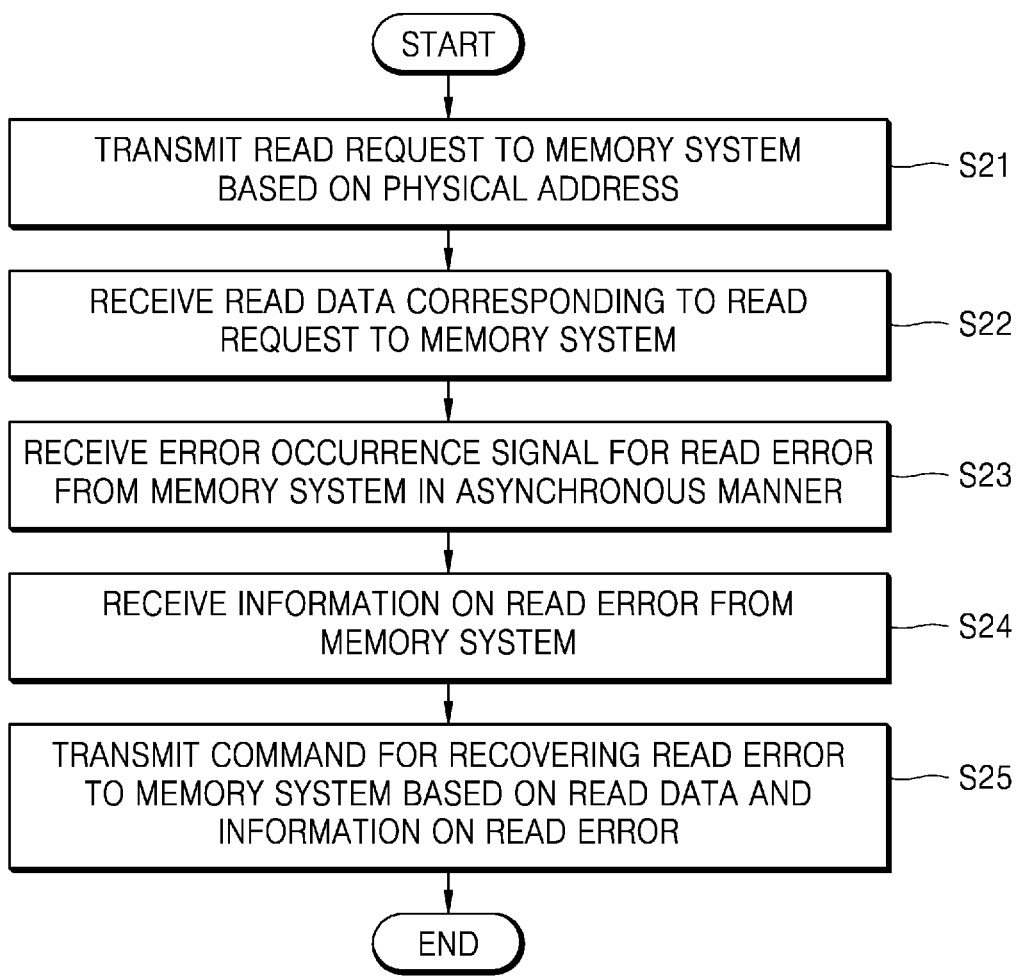
FIG. 6 is a flowchart illustrating an operation method of a host according to an embodiment.

FIG. 6 is a flowchart illustrating an example of an operation method of the host according to the embodiment.

The operation method according to the present embodiment may be performed by the host 200 of FIG. 1 or 2. Hereinafter, the operations illustrated in FIG. 6 will be described as being performed by the host, but more specifically, at least some of the operations illustrated in FIG. 6 may correspond to operations performed by the recovery module of the host.

First, the host may transmit the read request to the memory system based on the physical address at operation S21. For example, the host may provide the read request based on the physical address by using the mapping information of the memory system.

The host may receive the read data corresponding to the read request from the memory system at operation S22. For example, the read data corresponding to the read request may be data obtained by correcting an error bit existing in the data read from the memory device by the memory system.

The host may receive the error occurrence signal from the memory system in the asynchronous manner at operation S23. The host may receive the information on the read error from the memory system at operation S24. For example, when the error occurrence signal, or for example the asynchronous event information AEI, is received, the host may correspondingly transmit a signal for requesting information on an error to the memory system. In addition, the host may receive the information on the read error from the memory system. In embodiments, the host may also receive the information on an error from the memory system regardless of whether a signal for requesting the information on the error is transmitted. In this case, the host may store the information on the received error in a memory of the host.

The host may transmit the recovery command for recovering the read error to the memory system based on the read data and the information on the read error at operation S25. As one example, when the information on the read error does not include read data read and corrected by the memory system 100 in response to the read request of step S21, the host 200 may provide the read request to the memory system 100 again based on the physical address of the read request. The memory system 100 may read data again, correct the read data, and provide the corrected data to the host 200. The host 200 may determine a new physical address based on the mapping information of the memory system 100 and the information on the read error. The host 200 may provide the write request to the memory system 100 based on the corrected read data and the new physical address which are obtained again.

As another example, when the information on the read error includes the data read and corrected by the memory system 100 in response to the read request of step S21, the host 200 may check the corrected read data included in the information on the read error. The host 200 may determine the new physical address based on the mapping information of the memory system 100. The host 200 may provide the memory system 100 with the write request for recovering the read error based on the corrected read data and the new physical address.

Figure 7:
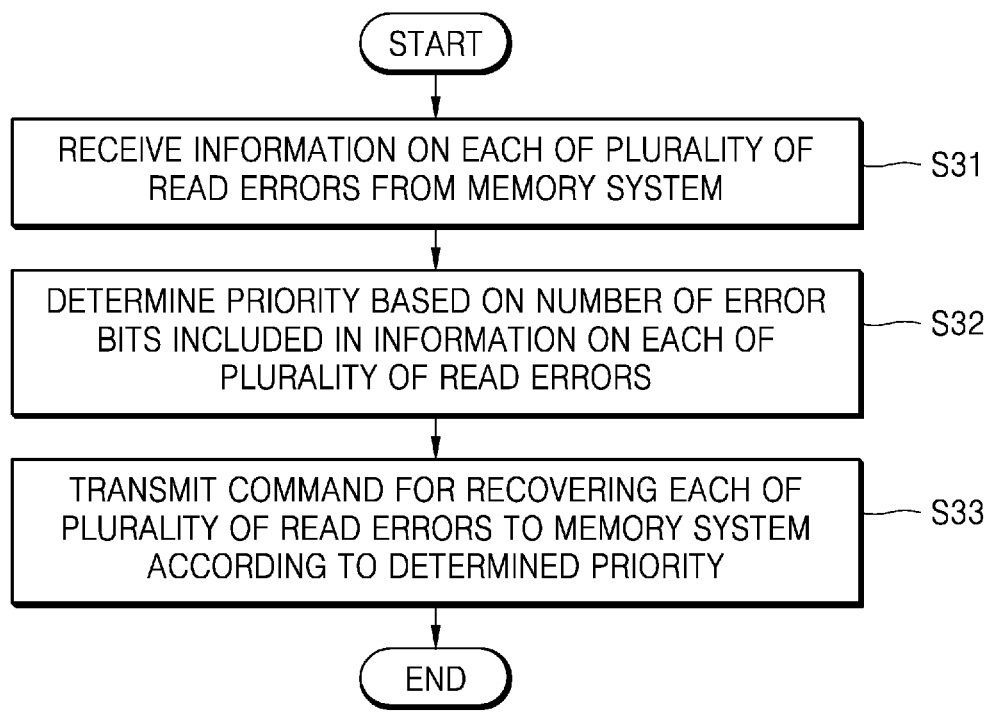
FIG. 7 is a flowchart illustrating the operation method of the host according to an embodiment.

FIG. 7 is a flowchart illustrating an example of the operation method of the host according to the embodiment. In detail, FIG. 7 illustrates an example of the operation method of the host when a plurality of read errors occur.

Referring to FIG. 7, the host may provide a plurality of read requests, and the plurality of read errors may occur while the memory system performs a plurality of read operations. Hereinafter, an example of the operation method of the host in a case where the plurality of read errors occur will be described. In addition, in describing operations of steps illustrated in FIG. 7, detailed description on steps overlapping the steps of FIG. 6 described above will be omitted.

First, the host may receive information on each of the plurality of read errors from the memory system at operation S31. The host may determine priority based on the number of error bits included in the information on each of the plurality of read errors at operation S32. For example, the host may check the number of error bits included in the information on each of the plurality of read errors and determine that the higher the number of error bits, the higher the priority. In addition, a method of determining the priority based on the number of error bits is not limited to the example described above, and the priority may be determined based on information other than the information on the number of error bits among the various types of information on the read error according to the embodiment.

The host may transmit recovery commands for respectively recovering the plurality of read errors to the memory system according to the determined priority at operation S33. For example, the host may check errors having the large number of error bits among the plurality of read errors, generate first the recovery command for recovering the checked error, and provide the memory system with the recovery command.

According to the embodiment described above, by recovering a plurality of read errors according to priority, recovery may be performed first for a correctable error that is relatively likely to change into an uncorrectable error, and thus, the uncorrectable error may be further prevented from occurring.

Figure 8:
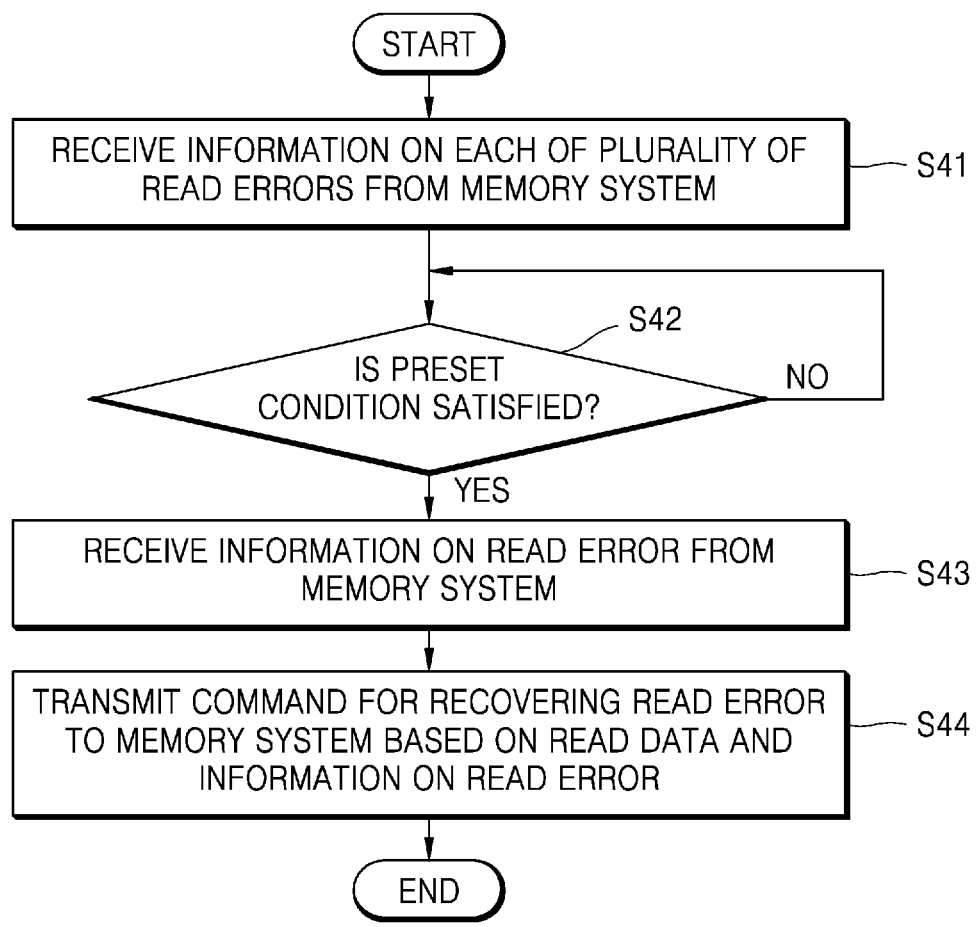
FIG. 8 is a flowchart illustrating a determination operation of the host at a recovery time according to an embodiment.

FIG. 8 is a flowchart illustrating an example of a determination operation of the host at a recovery time according to the embodiment.

FIG. 8 is a flowchart illustrating an example of the operation method of the host according to an embodiment. According to the present embodiment, when the error occurrence signal is received from the memory system, the host may determine a point in time to perform the recovery for the corresponding error to perform the recovery. In addition, in describing operations of steps illustrated in FIG. 8, detailed description on steps overlapping the steps of FIG. 7 described above will be omitted.

First, the host may receive the error occurrence signal for the read error from the memory system in an asynchronous manner at operation S41. The host may determine whether an operation state of the host satisfies a preset condition at operation S42. The preset condition may mean that the host is in an idle state. For example, the host may determine whether the operation state of the host is in an idle state according to whether access to the memory system is currently being performed. In addition, the method of determining whether the operation state of the host is in the idle state is not limited to the example described above, the preset condition is not limited to the example described above.

When the operation state of the host satisfies the preset condition at YES in operation S42, the host may receive the information on the read error from the memory system at operation S42. As an example, when the host satisfies the preset condition such as the idle state, the host may determine that it is time to perform the recovery operation. The host may transmit the request signal for requesting the information on the error to the memory system and receive the information on the read error from the memory system. The host may transmit the recovery command for recovering the read error to the memory system based on the read data and the information on the read error at operation 544. In contrast to this, when the operation state of the host does not satisfy the preset condition at NO in operation S42, the host may return to the previous step.

In addition, according to the embodiment, the operation of determining a point in time when the host performs the recovery may also be performed after the error occurrence signal is received not when the error occurrence signal is received in the asynchronous manner as illustrated in FIG. 8. Hereinafter, another embodiment that performs an example of the recovery by determining a point in time when the host performs the recovery will be described.

Figure 9:
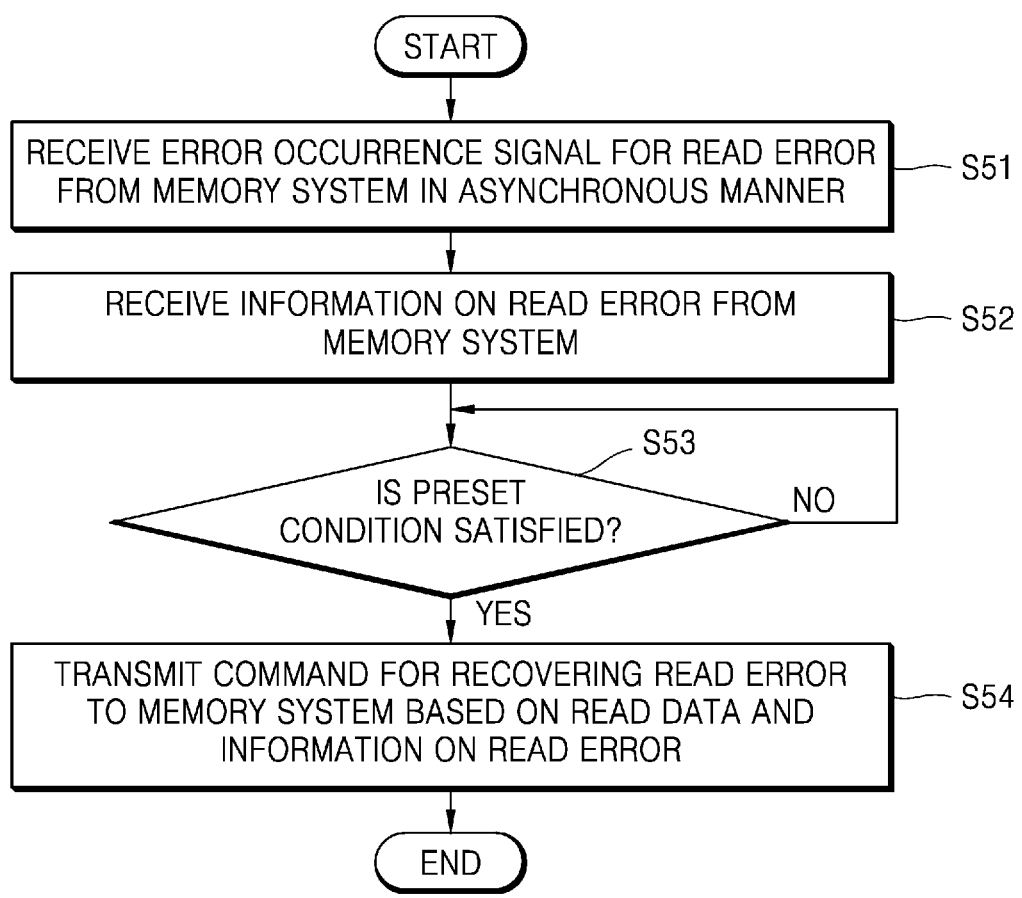
FIG. 9 is a flowchart illustrating the determination operation of the host at the recovery time according to an embodiment.

FIG. 9 is a flowchart illustrating an example of the determination operation of the host at the recovery time according to the embodiment.

FIG. 9 is a flowchart illustrating an example of the operation method of the host according to an embodiment. In addition, in describing operations of steps illustrated in FIG. 9, detailed description on steps overlapping the steps of FIGS. 7 and 8 described above will be omitted.

First, the host may receive the error occurrence signal for the read error from the memory system in an asynchronous manner at operation S51. The host may receive the information on the read error from the memory system at operation S52. The host may determine whether the operation state of the host satisfies a preset condition at operation S53. The preset condition may indicate that the host is in the idle state as described above with reference to FIG. 8. In embodiments, according to the embodiment, the preset condition may indicate a case in which a subsequent operation of the host for the memory system is associated with a physical address where the read error occurs. For example, the host may plan to perform garbage collection for the memory system or may plan to set data of a certain region of the memory system as invalid data. At this time, the host may determine whether a target of the garbage collection or a target set as the invalid data is included in the physical address checked from the received information on the read error. When the targets are included in the physical address in which the read error occurs, the host may recover the read data corresponding to the read error, and then, transmit the write request for remaining data except the target of the garbage collection or the invalid data to the memory system, and thus, the recovery operation may be performed. Accordingly, the host may achieve the whole purpose of not only recovering the read error but also setting to the garbage collection or the invalid data by performing one operation. In addition, the preset condition is not limited to the example described above.

When the operation state of the host satisfies the preset condition at YES in operation S53, the host may transmit the recovery command for recovering the read error to the memory system based on the read data and the information on the read error at operation S54. For example, when the preset condition is satisfied as in a case where the host is in an idle state or a subsequent operation, for example, setting to the garbage collection or the invalid data, of the host is associated with the physical address in which the read error occurs, the host may determine that it is time to perform the recovery operation. In contrast to this, when the operation state of the host does not satisfy the preset condition at NO in operation S53, the host may return to the previous step.

According to the embodiments of FIGS. 8 and 9 described above, the host performs the recovery operation at a point in time when is appropriate for performing the recovery operation, for example, at a point in time when a specified operation is not performed between the host and the memory system, or at a point in time when a subsequent operation performed by the host is associated with a region where the read error occurs, and thus, the host may perform a more efficient recovery operation.

Figure 10:
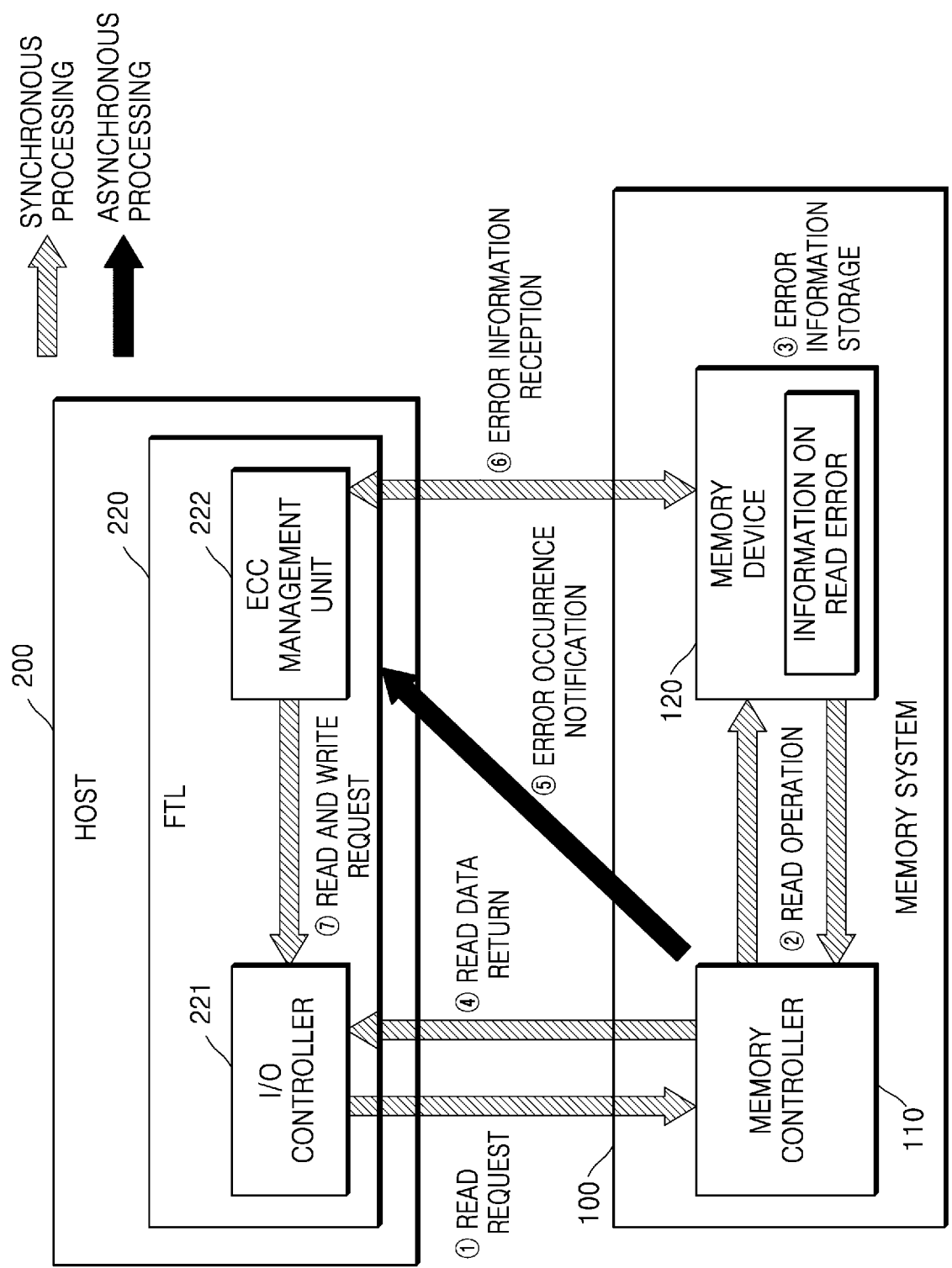
FIG. 10 is a conceptual diagram illustrating an operation of each of the host and the memory system for recovery of a read error in the computing system according to an example embodiment.

FIG. 10 is a conceptual diagram illustrating an operation of each of the host and the memory system for the recovery of the read error in the computing system according to an example embodiment.

The operation method according to the present embodiment may be performed by the computing system 1000 of FIG. 1 or 2. The description made with reference to FIGS. 1 to 9 may be applied to the present embodiment. The host 200 may include the flash translation layer 220, and the flash translation layer 220 may include an input/output controller 221 and an ECC management unit 222. The flash translation layer 220, the input/output controller 221, and/or the ECC management unit 222 may configure a part of the recovery module, for example recovery module 210 of FIG. 1, of the host 200. The input/output controller 221 and the ECC management unit 222 may be implemented by hardware or software or may be implemented by a combination of the hardware and the software.

First, the host 200 may transmit the read request to the memory controller 110 through the input/output controller 221 at operation ①. The memory controller 110 may read data from the memory device 120 based on the received physical address at operation ②. At this time, the memory controller 110 may detect the read error from the read data and correct the read data when the read error is detected. The memory controller 110 may generate the information on the read error and store the information on the read error in the memory device 120 at operation ③. In addition, according to the embodiment, the information on the read error may be stored in a buffer of the memory controller 110. The memory controller 110 may transmit the corrected read data to the input/output controller 221 of the host 200 at operation ④. A series of operations ① to ④ of the host 200 and the memory controller 110 may be performed synchronously.

The memory controller 110 may transmit the error occurrence signal to the ECC management unit 222 of the host 200 in an asynchronous manner at operation ⑤. The ECC management unit 222 may acquire the information on the read error stored in the memory device 120 at operation ⑥. For example, the ECC management unit 222 may transmit a request signal for requesting the information on the read error to the memory controller 110, and the memory controller 110 may read the information on the read error from the memory device 120 and transmit the information to the ECC management unit 222. In addition, according to the embodiment, the operation of transmitting the request signal by the ECC management unit 222 may be performed when the host 200 satisfies a preset condition, for example, an idle state.

The ECC management unit 222 may transmit the recovery command for recovering the read error to the input/output controller 221 at operation ⑦. For example, the ECC management unit 222 may transmit a read request for reacquiring the read data having the read error to the input/output controller 221. The input/output controller 221 may transmit the read request to the memory controller 110 again, and the memory controller 110 may read data from the memory device 120 again according to the read request, correct the data, and transmit the corrected data to the input/output controller 221. The ECC management unit 222 may transmit the write request to the input/output controller 221 based on the read data obtained through the input/output controller 221 and the physical address newly determined based on the mapping information of the memory system 100. The input/output controller 221 may transmit the write request to the memory controller 110. The series of operations ⑥ and ⑦ of the host 200 and the memory controller 110 may be performed synchronously except the operation ⑤ of transmitting error occurrence information in an asynchronous manner.

Figure 11:
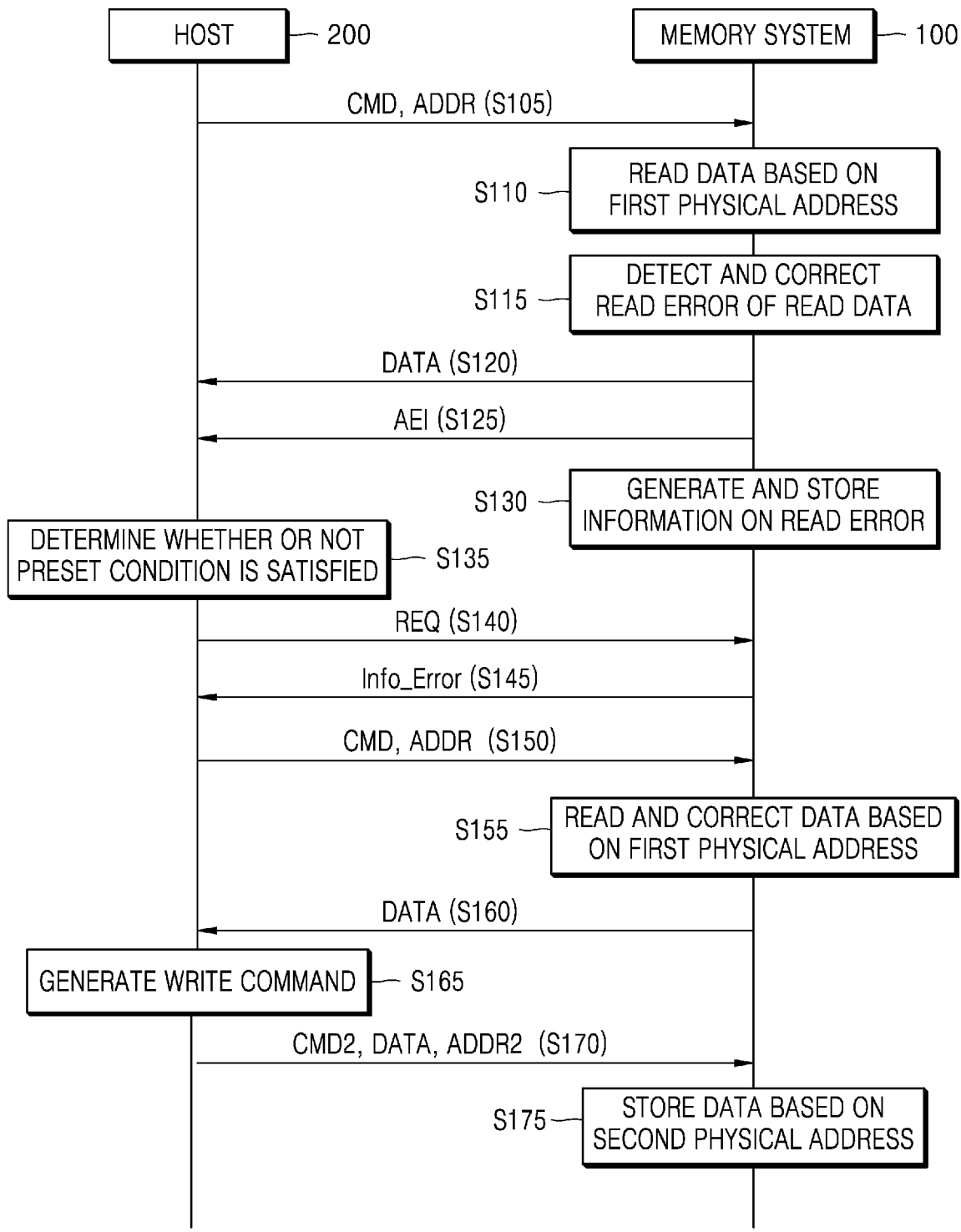
FIG. 11 is a flowchart illustrating a recovery method of the computing system according to an embodiment.

FIG. 11 is a flowchart illustrating an example of a recovery method of the computing system according to the embodiment.

The operation method according to the present embodiment may be performed by the computing system 1000 of FIG. 1 or 2.

First, the host 200 may transmit a read request to the memory system 100 at operation S105. For example, the host 200 may transmit the read command CMD and the first physical address ADDR. The memory system 100 may read data based on the received first physical address ADDR at operation S110.

The memory system 100 may detect the read error from the read data and correct the read data when the read error is detected at operation S115. The memory system 100 may transmit the corrected read data DATA to the host at operation S120.

The memory system 100 may transmit the asynchronous event information AEI to the host 200 at operation S25. The memory system 100 may generate the information on the read error and store the information on the read error at operation S130. The information on the read error may include the physical address of the read data having the read error, an error type indicating that the occurred error corresponds to the read error, the number of error bits of the read data, and so on.

The host 200 may determine whether an operation state of the host 200 satisfies a preset condition at operation S135. For example, it is possible to determine whether the preset condition is satisfied, such as a case where the host 200 is in an idle state or a subsequent operation of the host 200 is associated with the physical address in which the read error occurs.

The host 200 may transmit the request signal REQ for requesting information on the error to the memory system 100. For example, when the host 200 determines that the preset condition is satisfied, the host 200 may transmit the request signal REQ to the memory system 100.

The memory system 100 may transmit the information on the read error Info_Error to the host 200 at operation S145. For example, when the memory system 100 receives the request signal REQ, the memory system 100 may transmit the information on the read error Info_Error to the host 200.

The host 200 may retransmit the read request to the memory system 100 at operation S150. For example, the host 200 may retransmit the read command CMD and the first physical address ADDR. The memory system 100 may reread and correct data based on the received first physical address ADDR at operation S155. The memory system 100 may transmit the corrected read data DATA to the host at operation S160. Accordingly, the host 200 may obtain the corrected read data DATA as write data that is the basis of the write request for recovering the read error.

The host 200 may generate a new write request for recovering the read error of the memory system 100 at operation S165. For example, the host 200 may determine a second physical address ADDR2 which is a new physical address by using the mapping information of the memory system 100 and the information on the read error and generate a write request based on the second physical address ADDR2.

The host 200 may transmit the write request to the memory system 100 at operation S170. For example, the host 200 may transmit the write command CMD2, the write data DATA, and the second physical address ADDR2. The write data DATA may be the read data obtained by the reread request. The memory system 100 may write data based on the received write data DATA and the second physical address ADDR2 at operation S175.

In addition, according to an embodiment, the host may also obtain the write data that is a basis of a new write request for recovering the read error in another manner, and a detailed operation thereof will be described below.

Figure 12:
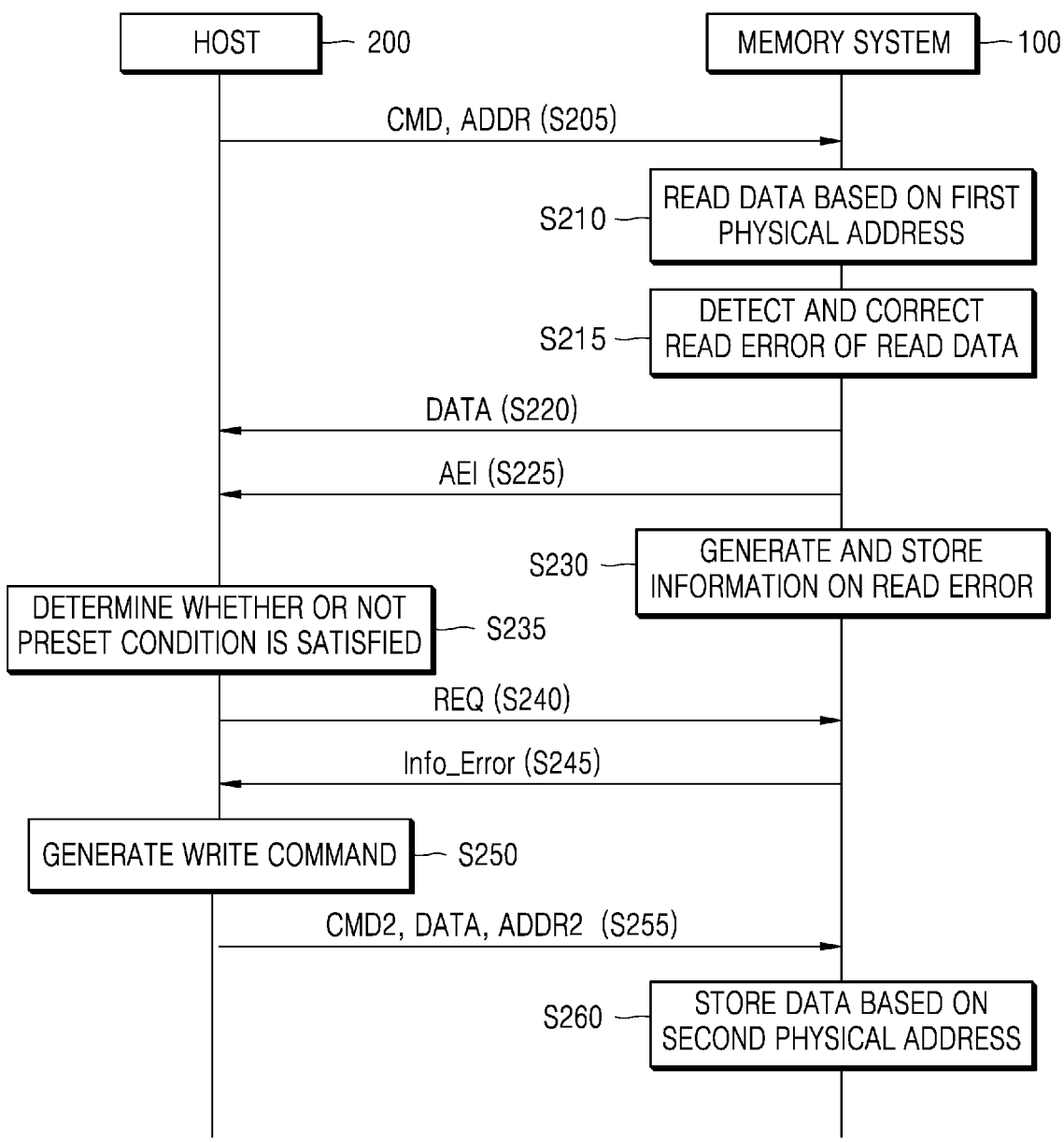
FIG. 12 is a flowchart illustrating the recovery method of the computing system according to an embodiment.

FIG. 12 is a flowchart illustrating an example of the recovery method of the computing system according to the embodiment.

FIG. 12 is a flowchart illustrating an example of the recovery method of the computing system according to an embodiment. For example, in describing operations of steps illustrated in FIG. 12, detailed description of the same steps as in FIG. 11 will be omitted.

First, the host 200 may transmit the read request to the memory system 100 at operation S205. For example, the host 200 may transmit the read command CMD and the first physical address ADDR. The memory system 100 may read data based on the received first physical address ADDR at operation S210. The memory system 100 may detect a read error from the read data and correct the read data when the read error is detected at operation S215. The memory system 100 may transmit the corrected read data DATA to the host at operation S220.

The memory system 100 may transmit the asynchronous event information AEI to the host 200 at operation S225. The memory system 100 may generate the information on the read error and store the generated information on the read error at operation S230. The information on the read error may include the physical address of the read data having the read error, an error type indicating that the occurred error corresponds to the read error, the number of error bits of the read data, and so on. In addition, the information on the read error may further include the read data DATA corrected by the memory system 100.

The host 200 may determine whether an operation state of the host 200 satisfies a preset condition at operation S235. The host 200 may transmit the request signal REQ for requesting the information on the error to the memory system 100 at operation S240. For example, when the host 200 determines that the preset condition is satisfied, the host 200 may transmit the request signal REQ to the memory system 100. The memory system 100 may transmit the information on the read error Info_Error to the host 200 at operation S245. For example, when the memory system 100 receives the request signal REQ, the memory system 100 may transmit the information on the read error Info_Error to the host 200.

The host 200 may generate the write request for recovering the read error at operation S250. For example, the host 200 may check the corrected read data DATA included in the information on the read error Info_Error. The host 200 may determine the second physical address ADDR2 which is a new physical address based on the mapping information of the memory system 100 and the information on the read error. The host 200 may generate the write request for recovering the read error based on the corrected read data DATA and the second physical address ADDR2.

The host 200 may transmit the write request to the memory system 100 at operation S255. For example, the host 200 may transmit the write command CMD2, the derived data DATA corrected as the write data, and the second physical address ADDR2. The memory system 100 may write data based on the received corrected read data DATA and the second physical address ADDR2 at operation S260.

According to the embodiment described above, because the corrected read data is included in the information on the read error generated by the memory system, an operation of transmitting the read request again from the host to the memory system to obtain the write data for the write request for recovering the read error and receiving the corrected read data may be omitted.

In illustrating and describing FIGS. 11 and 12, the operation of determining whether the preset condition of the host is satisfied is illustrated and described as being performed after receiving the asynchronous event information AEI but may be performed after the information on the read error is received from the memory system.

Figure 13:
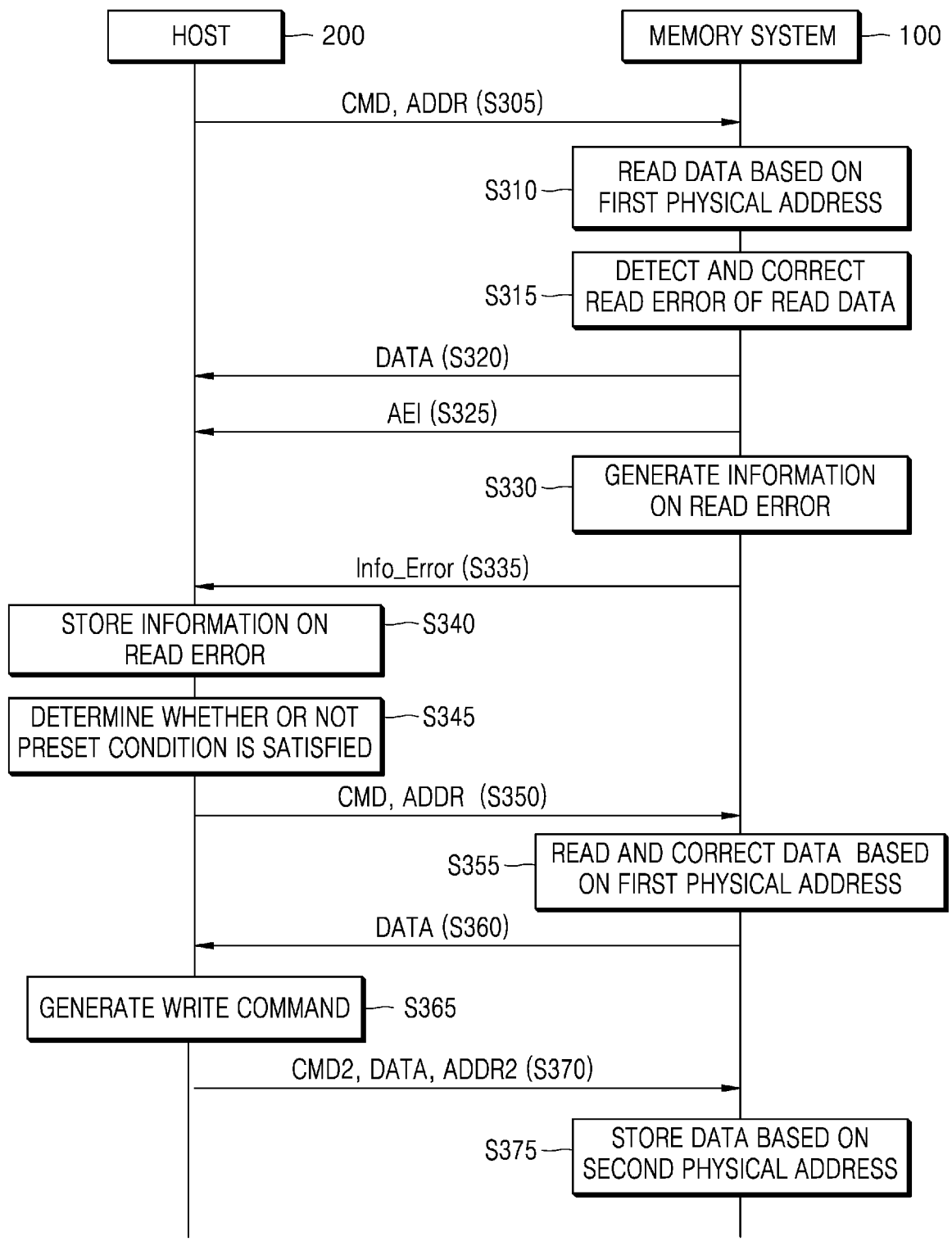
FIG. 13 is a flowchart illustrating the recovery method of the computing system according to an embodiment.

FIG. 13 is a flowchart illustrating an example of the recovery method of the computing system according to the embodiment.

FIG. 13 is a flowchart illustrating an example the recovery method of the computing system according to an embodiment. The memory system may generate the information on the read error but may not have a function of storing the information on the read error according to the embodiment. Hereinafter, an example in which the host has the function of storing the information on the read error will be described. For example, in describing operations of steps illustrated in FIG. 13, detailed description on steps overlapping the steps of FIG. 11 or 12 will be omitted.

First, the host 200 may transmit the read request to the memory system 100 at operation S305. For example, the host 200 may transmit the read command CMD and the first physical address ADDR. The memory system 100 may read data based on the received first physical address ADDR at operation S310. The memory system 100 may detect the read error from the read data and correct the read data when the read error is detected at operation S315. The memory system 100 may transmit the corrected read data DATA to the host at operation S320.

The memory system 100 may transmit the asynchronous event information AEI to the host 200 at operation S325. The memory system 100 may generate the information on the read error at operation S330. The memory system 100 may transmit the information on the read error Info_Error to the host 200 at operation S335.

The host 200 may store the information on the read error Info_Error at operation S340. For example, the host 200 may store the received information on the read error Info_Error in a buffer of the host 200. Whether the operation state of the host 200 satisfies the preset condition may be determined at operation S345. The host 200 may retransmit the read request to the memory system 100 at operation S350. For example, the host 200 may retransmit the read command CMD and the first physical address ADDR. The memory system 100 may reread and correct data based on the received first physical address ADDR at operation S355. The memory system 100 may transmit the corrected read data DATA to the host at operation S360.

The host 200 may generate a new write request for recovering the read error of the memory system 100 at operation S365. For example, the host 200 may determine the second physical address ADDR2 which is a new physical address by using the mapping information of the memory system 100 and the information on the read error and may generate a write request based on the second physical address ADDR2.

The host 200 may transmit the write request to the memory system 100 at operation S370. For example, the host 200 may transmit the write command CMD2, the read data DATA corrected as write data, and the second physical address ADDR2. The memory system 100 may write data based on the received corrected read data DATA and the second physical address ADDR2 at operation S375.

According to the embodiment described above, the memory system transmits the information on the read error directly to the host without storing the information, and thus, resources of the memory system may be saved.

As is traditional in the field of the inventive concepts, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The above-described embodiments are all exemplary, and thus, the inventive concept is not limited to the embodiments and may be realized in various other forms. While the embodiments have been particularly shown and described, it will be understood that various changes in form and details may be made therein without departing from the spirit and scope of the following claims.

What is claimed is:

1. A method of operating a memory system including a memory device, the method comprising:
    reading data from the memory device based on a first physical address received from a host according to a read request received from the host;
    detecting a read error of the read data;
    correcting the read data based on the detecting;
    transmitting the corrected data to the host;
    asynchronously transmitting to the host an error occurrence signal for the read error;
    generating information about the read error, by the memory system;
    transmitting the information about the read error to the host; and
    rewriting the corrected data based on a second physical address received from the host according to a write request of the host.

2. The method of claim 1, wherein the information about the read error includes at least one of a physical address, an error type, and a number of error bits of the read data.

3. The method of claim 1, wherein the information about the read error includes the corrected data.

4. The method of claim 1, wherein the first physical address is different from the second physical address.

5. A method of operating a host configured to control a memory system, the method comprising:
    transmitting a read request from the host to the memory system based on a first physical address;
    receiving read data corresponding to the read request from the memory system;
    asynchronously receiving an error occurrence signal for a read error corresponding to the read data from the memory system;
    receiving information about the read error from the memory system; and
    transmitting a recovery command for recovering the read error to the memory system based on the read data and the information about the read error,
    wherein the transmitting of the recovery command comprises:
        determining a second physical address using the information about the read error; and
        transmitting a write request for writing the read data to the second physical address to the memory system,
    wherein the transmitting of the recovery command to the memory system further comprises:
        retransmitting the read request to the memory system; and
        receiving a duplicate copy of the read data from the memory system, and
    wherein the write request comprises a request for writing the received duplicate copy of the read data to the second physical address.

6. The method of claim 5, wherein the information about the read error includes the read data.

7. The method of claim 6, wherein the write request comprises a request for writing the read data included in the information about the read error to the second physical address.

8. The method of claim 5, wherein the first physical address is different from the second physical address.

9. The method of claim 5, wherein the information about the read error includes at least one of a physical address, an error type, and a number of error bits of the read data.

10. The method of claim 5, further comprising:
    receiving information about a plurality of read errors from the memory system; and
    determining a priority corresponding to the plurality of read errors based on the information about the plurality of read errors,
    wherein the transmitting of the recovery command to the memory system comprises transmitting a plurality of recovery commands for recovering the plurality of read errors to the memory system based on the information about the plurality of read errors according to the determined priority.

11. The method of claim 5, wherein the information about the read error is received from the memory system based on an information request transmitted to the memory system by the host.

12. The method of claim 11, wherein the information request is transmitted to the memory system based on a determination by the host that the host is in an idle state.

13. The method of claim 5, further comprising:

determining, by the host, whether the read data includes at least one of target data of garbage collection for the memory system or invalid data of the memory system; and transmitting the recovery command to the memory system by the host based on the at least one of the target data of the garbage collection or the invalid data being included in the read data corresponding to the read error.

14. The method of claim 5, further comprising:

receiving a response signal corresponding to the recovery command from the memory system; and updating mapping information of the memory system by the host based on the response signal.

15. A computing system comprising:

a memory system including a memory device; and a host configured to transmit a read request including a first physical address to the memory system, wherein the memory system, in response to the read request of the host, is configured to:

read data from the memory device based on the first physical address received from the host, detect a read error of the read data, correct the read data based on the detecting, transmit the corrected data to the host, wherein the memory system is further configured to:

asynchronously transmit an error occurrence signal for the read error to the host, generate information about the read error, by the memory system, and transmit the information about the read error to the host, and wherein, based receiving on the error occurrence signal, the host is configured to transmit a recovery command for recovering the read error to the memory system based on the corrected data and the information about the read error.

16. The computing system of claim 15, wherein the host is configured to:

determine a second physical address using the information about the read error, and transmit a write request for writing the corrected data to the second physical address to the memory system.

17. The computing system of claim 15, wherein the memory system is configured to:

store the information about the read error, and transmit the information about the read error to the host based on receiving a request for the information about the read error.

18. The computing system of claim 15, wherein the host is configured to store the information about the read error based on receiving the information about the read error.

* * * * *